United States Patent [19]

Cremers

[11] Patent Number: 4,630,894
[45] Date of Patent: Dec. 23, 1986

[54] MULTI-COLORED LIQUID CRYSTAL DISPLAY WITH COLOR TRANSFLECTOR AND COLOR FILTER

[75] Inventor: Rolf A. Cremers, Marxzell, Fed. Rep. of Germany

[73] Assignee: Borg Instruments GmbH, Fed. Rep. of Germany

[21] Appl. No.: 591,533

[22] Filed: Mar. 20, 1984

[30] Foreign Application Priority Data

Mar. 23, 1983 [DE] Fed. Rep. of Germany ....... 3310444
Mar. 23, 1983 [DE] Fed. Rep. of Germany ....... 3310427

[51] Int. Cl.$^4$ ............................................. G02F 1/133
[52] U.S. Cl. .................................. 350/338; 350/339 F; 350/345; 350/347 E; 350/349
[58] Field of Search ............... 350/349, 339 D, 339 F, 350/345, 338, 337, 347 E

[56] References Cited

U.S. PATENT DOCUMENTS

| 3,597,044 | 9/1968 | Castellano | 350/349 X |
| 3,869,195 | 3/1975 | Aldrich et al. | 350/345 |
| 4,228,029 | 10/1980 | Osman | 350/350 R |
| 4,470,666 | 9/1984 | Eick | 350/339 F |
| 4,488,786 | 12/1984 | Caramel | 350/339 D |

FOREIGN PATENT DOCUMENTS

| 2944325 | 5/1981 | Fed. Rep. of Germany . |
| 3048024 | 10/1981 | Fed. Rep. of Germany . |
| 3032988 | 4/1982 | Fed. Rep. of Germany . |
| 3148447 | 10/1982 | Fed. Rep. of Germany . |
| 0043506 | 3/1980 | Japan | 350/349 |
| 619301 | 9/1980 | Switzerland . |
| 2094051 | 9/1982 | United Kingdom . |

OTHER PUBLICATIONS

Schadt et al., "New Liquid Crystal Materials; Physical Properties and Performance in Displays for Automobile, High Information Density and Guest-Host Applications", Mol Cryst. Liq. Cryst., 1983, vol. 94, pp. 139-153.

Primary Examiner—John K. Corbin
Assistant Examiner—David Lewis
Attorney, Agent, or Firm—Scully, Scott, Murphy & Presser

[57] ABSTRACT

A multi-colored liquid crystal display arrangement, especially for motor vehicle instruments, including colored foils with different colorings spatially associated with a plurality of mutually offset and differing information areas of the display, intermediate a liquid crystal cell and a large-surfaced illuminating arrangement. The multi-colored liquid display arrangement is additionally equipped with a transflector which is positioned between the color foils and the liquid crystal cell, and wherein the transflector incorporates differently colored areas which are spatially associated with predetermined color foils.

8 Claims, 3 Drawing Figures

U.S. Patent  Dec. 23, 1986  4,630,894
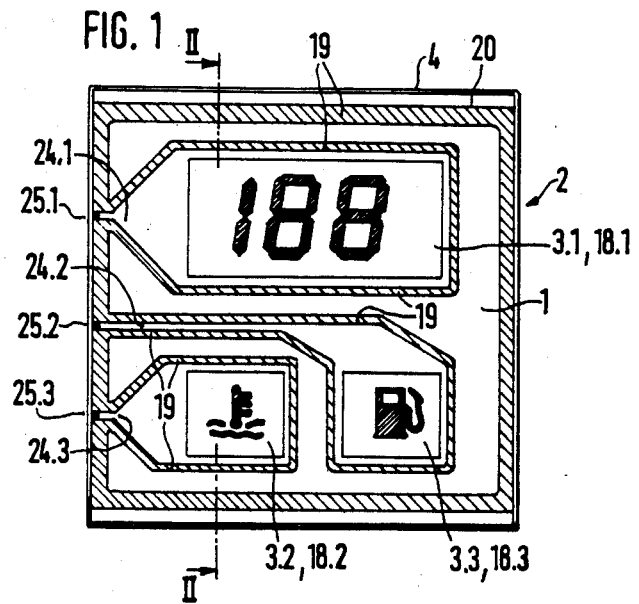
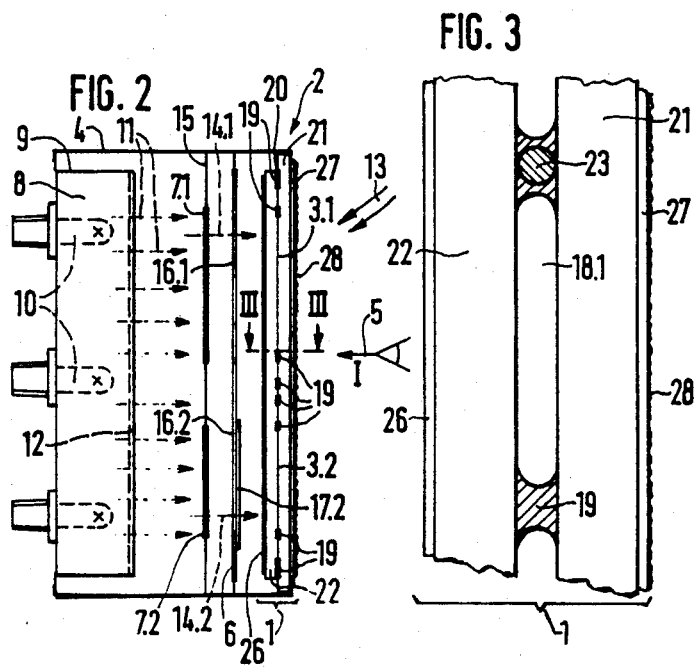

MULTI-COLORED LIQUID CRYSTAL DISPLAY WITH COLOR TRANSFLECTOR AND COLOR FILTER

BACKGROUND OF THE INVENTION

1. Field of the Invention

The present invention relates to a multi-colored liquid crystal display arrangement, especially for motor vehicle instruments, including colored foils with different colorings spatially associated with a plurality of mutually offset and differing information areas of the display, intermediate a liquid crystal cell and a large-surfaced illuminating arrangement.

The invention further relates to a process for the optimization of the contrast of field effect-liquid crystal cells, particularly for optimizing the contrast of transmissively drivable field effect-liquid crystal cells, especially for negative contrast representation, and in particular large-surfaced liquid crystal cells for motor vehicle instrumentation, in which liquid crystal material with an anisotropic optical refractory number is enclosed between transparent plates, the facing surfaces of which are covered with information symbol electrodes, and whose outwardly facing surfaces are covered with polarized filters, such as a polarizer and analyzer. In particular, the invention relates to large-surfaced liquid crystal cells with negative-contrast representation during transmissive (in essence, transilluminating) operation, even at a high environmental brightness, and with information representations on different surfaces areas in different colors, such as is especially utilized for motor vehicle instrumentation.

2. Discussion of the Prior Art

A display arrangement of that type is disclosed in German Laid-open Patent Application No. 30 32 988. The known arrangement incorporates a prismatic light conductor as a large-surfaced illuminating arrangement, which is irradiated through one side surface thereof and in which the opposite light discharging surface is equipped with a reflector. Located between the liquid crystal cell and the light discharging surface of the illuminating prism is a symbol mask including, in the viewing direction of the display arrangement, a color filter arranged therebehind. The color filter incorporates different mutually bounded colored areas which are associated with differently located symbols of the information which is to be represented in toto. The display arrangement thus operates purely transmissively, with fixedly predetermined colors for the individual, mutually displaced and representable symbols. A disadvantage of this known display arrangement resides in the high technological manufacturing requirements for the formation and assembly of the prismatically profiled illuminating arrangement which is critical with respect to its optical coupling. Moreover, it is especially disadvantageous that such a display arrangement provides only an average, and in accordance with the color of the symbol which is to be displayed, even a completely different contrast; so that the contrast, in essence the recognizability, is rendered substantially poorer when, pursuant to the practical conditions of utilization of such a display arrangement, the light of the environmental brightness falls in the viewing direction onto the display arrangement, and the symbol representation of the liquid crystal cell is either obscured or even completely outshined. This can be counteracted through an increase in the transmissive illuminating intensity of the illuminating arrangement on the basis of the losses in the prismatic light conductor, and on the basis of the heat loss radiation of usual light sources, insofar as in a usual manner they are built into already small-sized housing of the display arrangement, and additionally influence in only a limited extent the operating behavior of the liquid crystal cell because of its dependence upon temperature.

A display arrangement which is similar in construction is disclosed in British Published Patent Application No. 20 94 051 for instrumentation as well as for larger-format information panels. For example, provided as a large-surfaced illuminating arrangement is an electroluminescent plate or a fluorescent lamp, which transilluminates a color foil from rearwardly thereof, and which is simultaneously irradiated from the front; in effect in the viewing direction of the display arrangement, by the brightness of the environment. The color foil carries, on its front surface, regional fluorescent color coatings, ahead of which there are located the symbol formations of a liquid crystal cell. This arrangement is subject to the advantage that at an increasing environmental brightness, there must be expected an extremely intense reduction in the color contrast. This, in turn, renders more difficult the easy visual ascertainability of the different displayable symbols; with which there is associated in the mind a predetermined color constellation which, however, becomes always less distinct at an increasing environmental brightness.

SUMMARY OF THE INVENTION

Accordingly, in recognition of these shortcomings and encountered conditions, it is an object of the present invention to so improve upon a multi-colored liquid crystal display arrangement of the usual constructional type whereby, while retaining proven technologies which due to cost factors are suitable for mass production, in a simple manner there can be achieved a significant contrast improvement with regard to the environmental brightness, as well as with regard to the different color representations.

The foregoing object is inventively achieved in that the multi-colored liquid display arrangement, as described hereinabove is additionally equipped with a transflector which is positioned between the color foils and the liquid crystal cell, and wherein the transflector incorporates differently colored areas which are spatially associated with predetermined color foils.

Within the framework of the inventive objects, utilization is made of a known fact that, at an intensively varying environmental brightness, it is suitable to have a mixed operation from a transmissive and reflective operating drive of the liquid crystal cell, and such as can be achieved through the building in of a transflector between the cell and the rearward illuminating arrangement; as is more closely described in greater detail for certain constructions in Swiss Pat. No. 619 301 and in the IBM Technical Disclosure Bulletin, Volume 15, 1973, pages 2435 et seq.

Within the scope of the inventive arrangement, such an interposition of a transflector between the liquid crystal cell and the different color foils has the effect the display arrangement will operate at night; in effect, at a low environmental brightness in the viewing direction, purely transmissively in the representative color of the respective color foil; whereas at an increasing environmental brightness, this night time operational coloring will brighten the information representation whereby, during operation in sunlight, this will lead to a practically white information representation. During operation in an environment with colored ambient light, the information representation is effected in a blended color, in which for a dark environmental field, the color foil color becomes more dominant, and in contrast therewith, at a bright environmental field, the color of the environmental light. In this manner, there changes the color impression of the information representation in dependence upon the environmental brightness; which, as a result of the color-dependent sensitivity of the human eye, facilitates an optimum contrast correlation with all environmental conditions at a transient color change. This capability is of particular significance in instrumentation panel displays for land of vehicles or aircraft, in which the driver of the vehicle or pilot is subjected to the usual environmental changes and therefore should not be additionally subjected to strains that by means of changing environmental conditions, that short there is drastically changed the overview of the instrumentation information which is detectable through a brief glance. Since the rearward transillumination of the transreflector will also be maintained under bright environmental conditions, there will be barely encountered any shadow projection-parallax phenomena, inasmuch as the the shadow projection of the reflective operating components is blended over by means of the rearward light irradiation. A particular additional advantage obtained, in this connection, lies that the optic differentiability of different representable informations can be increased to a predetermined extent; primarily the blended information representation during transition from night time operation to daylight operation (in effect, the transition from a lower to a higher environmental brightness in the viewing direction) can be modified areawise, inasmuch as different rearward illuminating light colors are associated with the white or metallically-bright transflector (in effect, on the surface thereof facing towards the liquid crystal cell) of differently colored coatings, such as color imprints.

Thereby, during night time operation there is obtained blended color from the transmission light color and the imprinted color; whereas during bright daylight with a unitary (for example, white) light color there are still distinguishable different information areas which appear in varying colorings, and thus the different information types can be more easily distinguished from each other.

As a special capability, within this framework, for predetermined information no color change is produced at all during transition from night time operation to daylight operation, in which the color imprint on the transflector associated with each area evidences the same color as the rearward colored transmission illumination; so that during (transmissive) night time operation, this information representation appears in the same color as during (almost reflective) daylight operation.

With respect to further possibility of a significant contrast increase, a particularly advantageous feature of the invention consists of in arranging the differently colored light areas which, during the transillumination of the transflector, are mutually bounded chamber-shaped areas, within the liquid crystal cell. While maintaining the proven and inexpensive manufacturing processes for such a liquid crystal cell, this can be concurrently equipped with a plurality of chambers which are separated from each other by means of adhesive tapes, into which there are filled in liquid crystal material mixtures which are slightly modified relative to each other. These modifications consist of in that the commercially obtainable standard liquid crystal materials are admixed pursuant to the measure of the associated transmission light colors. Moreover, in accordance with the measure of the transmission light colors, there can be provided, as guest colors materials for GH-displays, the commercially available color material additives to the respective liquid crystal chamber filling, in order to attain a broader temperature range of maximum absorption.

It is thus ensured that, even in the darkest environment, the segments of an information representation which are not electrically actuated, are transilluminated only very slightly by the transmission light, so as to provide an optimum contrast between the actuated segments and the non-actuated segments; in effect, the encompassing area.

A further improvement in the contrast, particularly during transition of the operating conditions from a dark to brighter environment, is obtained when the front polarizer; in effect, the analyzer of the TN liquid crystal cell, is covered with a thin, rough lacquer coating, such as is disclosed is disclosed in German Laid-open Patent Application No. 29 44 325 for eliminating the surface glare. The rough lacquer coating may herein additionally provide a glare removing effect; however it is decisive that the rearward projection of the drive which is still transmissive in a bright environment onto the rough lacquer coating leads therein to a light dispersion and, consequently, to a significant increase in the looking angle, whereas, even in a bright environmental light, this rough lacquer coating as a thin dull-surfaced plate, produces an additional shading from disturbing shadow projections on the transflector.

Thereby, through constructively simple and technologically uncritical additional measures in a usual TN liquid crystal cell with negative contrast representation within differently colored display areas, at an essential contrast improvement as a result of correlation with the individual colored areas, there is achieved an individual color change within the areas in accordance with the extent in the change of the environmental brightness, and thereby an optimum correlation to the receptability by means of the human eye.

With respect to additional suitable correlation capabilities for a further increase of the contrast in usual liquid crystal cells, there is assumed that due to the non-idealistic properties of technically available liquid crystal material, linearly polarized light after passage through the liquid crystal cells will again be elliptically polarized; so that, in essence, a polarization component is again produced in the cell material, which stands perpendicular or normal to the polarization direction of the light entering the cell. This perpendicular polarization component is thereby not absorbed by the analyzer in front of the cell, whose polarization direction is transverse to that of the polarizer behind the cell. Because of this imperfection in the optical properties of the liquid crystal material, the representation contrast is rendered poorer, since this light, which is polarized transverse to the main component, will shine through in the area of the non-activated symbol segments besides the actually activated (optically transmissive) symbol segments. This will be particularly disturbing at a lower environmental brightness (nighttime operation) of the display arrangement.

In order to compensate for this system-generated contrast loss; in effect, to so optimize the contrast (between the activated and the non-activated segments), it is known from German OS No. 30 48024 and German OS No. 31 48 447 to arrange two oppositely rotating liquid crystal cells behind each other, so as to thereby entirely compensate the undesireably cross-polarization encountered within the cell, as a result of their opposite orientation. This optimizing measure superproportionally increases the expense of manufacturing the display arrangement with such liquid crystal cells. This is because, on the one hand, the material correlation for the presently opposite components is critical with regard to the undesired cross-polarization; and above all, it is necessary to provide construction of an entire arrangement consisting of two separate cells because of the requirement of a precise geometric association of the symbol representations. Moreover, in an undesireable manner, there is thereby increased the requirement for liquid crystal material, and the need of built-in space for the combined, essentially double layer cell. Finally, the brilliance of the representation is deteriorated due to such a dual arrangement, inasmuch as the effective liquid crystal layer is thicker and a multiplicity of additional, basically optically loss-engengered components are positioned in sequence behind each other.

In recognition of these conditions and shortcomings, the present invention contemplates the provision of a process for optimizing the contrast of field effect-liquid crystal cells of the described constructional type, in which there are retained the advantages of the proven standard technology of the usual (single layer) cell constructions; in effect, no specialized additional manufacturing processes are required which would render more expensive the mass production, in which nevertheless, in comparison with the previously attained contrast obtained in usual cells, there is achieved a significant contrast increase and, consequently, an improvement in brilliance. For this purpose, the inventive process provides that for a predetermined color of the transmission light and thereby the display, as well as for the plate spacing, in effect the liquid crystal layer thickness, pursuant to a current liquid crystal cell manufacturing technology, from commercially available liquid materials of different an anisotropic of their optical refractory numbers but with the same or similar viscosities, there is recovered a liquid crystal blend, whose resultant anisotropy of the plate spacing is at least approximately correlated with desired display color, so that for a cell which is filled with this mixture or blend there can be measured the precise light wave-length in which the sequence of the transmission light intensity through the light wavelength passes through a minimum, and wherein, finally, for the drive of the liquid crystal cells, by means of a color foil there is filtered out of the non-monochromatic light from the transmission light of an illuminating arrangement, whose spectral median value lies at least approximately at the optimum wavelength which has just been measured.

For electro-optical displays under critical conditions (particularly with respect to the fluctuations in the environmental brightness and with respect to the deviation in the concentration of an observer), such as are encountered, for instance, during the steering of a vehicle, for the negative contrast-information presentation there is demanded a contrast between the information symbol and the environment (especially momentarily non-activated information components) in a ratio of 1:25. Usually TN-liquid crystals which are produced for the automotive industry raise this to a contrast ratio of almost 1:30. Pursuant to the opinion of the technology, any further increase can be achieved only by significantly departing from the usual manufacturing technologies or cell constructions. In contrast therewith, the mere color coordination according to the present inventive process provides, with the same employed materials and an unchanged manufacturing technology, a contrast of at least 1:80, and consequently liquid crystal-information representations with a brilliance which was heretofore not expected with accessible (on the basis of manufacturing costs suitable for mass production) liquid crystal cells.

BRIEF DESCRIPTION OF THE DRAWINGS

Reference may now be had to following detailed description of various features and advantages of the invention, taken in conjunction with the accompanying drawings illustrating, in a schematic manner, exemplary embodiments thereof; and in which:

FIG. 1 illustrates a plan view of a liquid crystal display arrangement with different information-representing areas;

FIG. 2 illustrates a sectional view of the display arrangement of FIG. 1 taken along line II—II, shown with a somewhat expanded representation of the internal construction of the display arrangement; and FIG. 3 illustrates on an enlarged scale the sectional fragmentary view along line II—II in FIG. 1 and as in FIG. 2, of adjacent areas of the liquid crystal cell in the display arrangement.

DETAILED DESCRIPTION

The multi-colored liquid crystal display arrangement 2 which is drawn in FIG. 1 with respect to the information representation of its liquid crystal cell 1, incorporates a plurality of information areas 3, which are positionally offset relative to each other, and are distinguished in color from each other. Thus, for example, in a numeric display area 3.1, alpha-numeric symbols in a seven-segment arrangement are colored-in in red, whereas information areas 3.2 and 3.3 with, for example, unchangeable symbols, evidence for optical distinction relative to each other, for example, green or yellow symbol representations.

In the case of the utilization of this display arrangement 2 as a universal instrument in motor vehicle instrumentation panels, the alpha-numeric representation of the information area 3.1 with variable information representation; for example, providing information retrieval for a momentary driving speed, a distance which has been traveled, or a time indication; while in contrast therewith the fixed symbols in the other areas 3.2 and 3.3 will respectively only come into optical appearance (in their respective coloring) when certain events have occurred; for example, when the radiator coolant has risen to an excessively high temperature (area 3.2), or fuel supply moves toward empty (area 3.3).

Pursuant to the longitudinal sectional view in FIG. 2, enclosed, within housing 4, mounted sequentially behind each other in the display arrangement 2 in the direction of viewing 5 are a large-surfaced standard liquid crystal 1 (referring also to FIG. 3), a transflector 6, colored foils 7, and a large-surfaced illuminating arrangement 5 which essentially extends over the entire cross-section of the display arrangement 2 and thereby over the liquid crystal cell 1. The illuminating arrangement 8 consists, for example, of a light box 9 into which there rearwardly project, in essence opposite to the viewing direction 5, lightbulbs 10, and whose light 11 is homogenized (diffusively strayed) through a dull-surfaced plate 12, and which exits opposite to the viewing or observing direction 5, which concurrently provides a predetermined thermal screening of the lightbulbs 10 relative to the actual cell 1.

Under usual operating conditions of the environmental brightness 13 which is incident on the display arrangement 2 in the viewing direction 5, there overweight the primarily transmissive drive of the liquid crystal cell 1 which is subdivided into individual areas 3. Hereby, for each information representation which is differently colored in each of the areas 3, opposite to the viewing direction 5, they are irradiated from the rear with correspondingly colored light 14, in effect, transilluminated in the case of the field-controlled activation of the liquid crystal cell 1. In order to obtain this light 14, which is differently colored-in in the various areas, there are provided mutually offset and differently colored color foils 7 behind the associated representation areas 3. These color foils 7 can be arranged as a color-transmissive coverings on correspondingly arranged openings in an apertured wall 15 between the illuminating arrangement 8 and liquid crystal cell 1 subdivided into the areas 3, or for example, also as adhesively connected film segments in conformance with the surface expanse and arrangement.

The transflector 6 which, in its basic color, is white or metallically bright; in effect, the partially-transmissive reflector between the liquid crystal cell and the colored foil 7 as sources of transmission light 14 differently colored-in in various areas, is transilluminated colored on its areas 16 associated with the information areas 3 for a colored information representation. When, on the transflector 6, in contrast with the rearwardly irradiated colored light 14, the light passing through the liquid crystal cell (according to the type of symbol control) is more intense than the environmental brightness 13, the transflector 6 then acts primarily as a bright reflector, and the colored information representation appears in a corresponding brighter color tone (for example, in the blended color with the light of the environmental brightness 13). At a transition from the lower to higher environmental brightness 13, the information representation color of the display arrangement 2 will thus increasingly brighten, for instance will change from red (during nighttime operation) through orange (during twilight operation) to bright-orange (during daylight operation) and, at times, (under sunshine providing the environmental brightness) to a white light-information representation. This corresponds to an optimum correlation with the dimming-dependent sensitivity of the human eye in the interest of an almost constant and thereby always optimized representation contrast.

It can be suitable, for the easier observation differentiation during the representation of different information within the different areas 3, that individual information representations are not subjected to this color change pursuant to the extent of the changes in the environmental brightness 13. Therefore, for example, in the applicable display partial area 3.2, the spatially associated transflector partial area 16.2 has on the surface facing towards liquid crystal cell 1, in the color of the spatially associated color transmission light 14.2, colored-in the color of the color foil 7.2 located therebehind, preferably with a corresponding color imprint 17.2. In this manner, the information representation in the associated area 3.2 is effected also during weakly transmissive drive (due to the intense environmental brightness 13) with still the same coloring as during intensively transmissive drive.

Environmental light-dependent color fluctuations between that transition to a bright or even white information representation and the maintenance thereof in the representation color, notwithstanding the increasing brightness of the environmental light 13, can notwithstanding be realized even when the color imprint 17 on the area of the transflector 6 is provided in a color which deviates from that of the transmission light 14 which is associated with that area. During nighttime operation, in effect, during an extensively transmissive drive of the liquid crystal cell 1, the blended color is overwhelmingly that of the colored light 14 and the color imprint 17, while in contrast therewith, during transition to daylight operation, the blended color is increasingly that the light of the environmental brightness 13 and the color imprint 17. In this manner, the display areas 3 of different significance can be clearly distinguished from each other through correspondingly stepped representative colors and, in particular, also correlated color variations, which enhances the observing capacity of the viewer and his concentration on the essential information in a desirable manner.

This result is achieved by means of an ordinary rotary cell (TN-liquid crystal cell) with parallel polarizers 26, 27, for bright symbol representation on a dark background; in effect, without the need for any change from the accepted standard manufacturing processes to more expensive specialized processes and special constructions of such liquid crystal cells; namely, merely by the association of corresponding color transflector areas 17 with a colored transmission light 14 behind a standard liquid crystal cell 1, in which the different information areas 3 are displaced relative to each other. In particular, these measures are carried out externally of the cell 1, as a result of which there are avoided any influences on the behavior of the liquid crystal material due to color materials; and standard cells 1 can be combined with suitable groupable colored foils 7 and transflectors 6 in order to fulfill special information display requirements in the arrangement 2.

However, it can also be suitable that, for a further increase in the optical properties of this multiple area-display arrangement 2, the individual information areas 3 be structurally bounded relative to each other within the liquid crystal cell 1, in which every information area 3 has its own chamber 18 associated therewith, which is individually filled with contrast-optimizing liquid mixtures or blends.

As can be ascertained from the overall representation in FIG. 1, these chambers 18 are enclosed by adhesive tapes 19 (and thereby spatially separated from adjacent chambers 18), as they are also constructed to extend in parallel with the edges 20 of a liquid crystal cell 1, in order to connect the front plate 21 thereof (FIG. 3) with the back plate 22.

The adhesive tapes 19 for the definition of the respective chamber 18 can thus be applied in the same manner, and simultaneously with the adhesive tapes 19 along the edges 20 of the plates 21, 22, by means of a currently used screening process applied onto one of the plates 21, 22, and effect through spacer particles 23 for the define plate spacing for the liquid crystal cell 1, which also imparts a desireable increase to the stability of the cell construction.

The usual coating of the surfaces of the plates 21, 22 facing the chambers with individual electrically-actuatable symbol electrodes (conforming to the information representations pursuant to FIG. 1) is not illustrated in detail in the drawing. This subdivision of large-surfaced liquid crystal cell 1 into individual chambers 18, which are directly associated with the information areas 3, provides a further saving in the liquid crystal material which is to be filled in, inasmuch as the total hollow space between the plates 21, 22 need not be filled, but the filling is limited to the volume of the individual mutually-enclosed chambers 18.

For the filling with liquid crystal material, each of the chambers 18 reduces to passageways 24 which terminate at the rim 20 of the liquid crystal cell 1 as filler openings 25 through the formation of an interruption in the adhesive tapes 19 at these locations. These filler openings 25 are preferably located adjacent each other along the same rim 20 so that, during an upward orientation, all of the chambers 18 can be simultaneously or sequentially filled without requiring any turning, and subsequently all filler openings 25 can be hermetically sealed in a usual manner.

The subdivision of the liquid crystal cell 1 into separate chambers 18 which are associated with the individual areas 3 of colored information representation, further provides the advantage that every liquid crystal filling can be optimally correlated with the colored transmission light 14 which is associated with the respective area 2. The object of this optimization is the contrast of the information representation (through electrically-actuated electrodes) with respect to the environment (the momentarily non-actuated electrodes and the background); this optimum signifies that there is minimized a transillumination of the colored transmission light 14 through the information segments with the momentarily non-actuated electrodes. Therefore, not every one of the chambers 18 are filled with identical liquid crystal material, but filler materials are so blended in accordance with the measure of the spatially associated color transmission light 14 that, at an absent cell control, they will provide maximum absorption for the spectral median point of the filtered out colored light 14. A certain spectral band width of the transmission light 14 hereby provides, in a desirable manner, a higher light density then the also technically more complex, use of monochromatic light sources. For temperature stabilization color particles can be admixed with the liquid crystal material, such as are known as guest materials (dyes) for guest host displays. This color material addition is, however, much less than in such GH-displays; so that through this addition, in the present instance, of the individual filling of the chambers 18 neither undesirable additional field effects will occur, nor will there be significantly reduced the operating properties of the display arrangement 2 through any viscosity increase (as set forth hereinbelow).

Inasmuch as the transflector 6, in the viewing direction 5, lies behind the back polarizer 26, and thus behind the plane of the chambers 18, during daylight operation under an inclined light incidence, there appears from the environmental brightness 13 a shadow throw of the information representation relative to the longitudinal axis of the display arrangement 2, which is offset relative to the normal viewing direction 5, onto the (occasionally partially colored coated) front side of the transflector 6, which on the basis of the viewing direction 5, would be disturbing in appearance as parallaxes. However, inasmuch as during daylight operation the transflector 6 remains transilluminated from the rear with light 11 from the light box 9, the shadow projection which is expected on the transflector 6 is transmissively shined over, so that under normal conditions of the environmental brightness 13, these disturbing parallaxes are precluded.

The parallax-like disruptive effects of such a shadow the projection on the front side of the transflector 6 facing towards the liquid crystal cell 1 are also additionally reduced, in that the front surface of an analyzer 27, in essence, the front polarizer ahead of the front plate 21, is coated with an extremely thin layer of an antireflex lacquer, such as is commercially available, for example, under the tradenames "Teleflex" or "Glarechequ". This (in comparison with the present antireflex coatings) extremely thin applied rough lacquer coating 28 leads to only a minor reduction in the contrast between the information representation and the environment on the liquid crystal cell 1. On the other hand, the direct observation capability in the viewing direction 5 through the activated areas of the liquid crystal cell 1 is attenuated as a result of the externally applied dull plate-like rough lacquer coating 28. Concurrently, the light is subjected to dispersion in opposition to in the viewing direction 5 on the inwardly irradiated information projections, as shown in FIG. 2, on the rough lacquer coating 28, which provides a desirable increase in the observing-viewing angle, without that residual shadow effects in the viewing direction 5 will disruptively come into appearance on the front side of the transflector 6.

The degree of dispersion due to the rough lacquer coating 28 should be as high as possible for use in increasing the angle of observation, which signifies that projected light should be irradiated as diffuse as possible by the rough lacquer or the dull lacquer surface. On the other hand, with an increasing dispersion gradient, the contrast is drastically reduced during reflective operation through direct reflection on the lacquer surface (due to brightening of the otherwise dark background). In addition thereto, in dependence upon the glass thickness of the cell 1, at an increase dispersing degree, there is reduced the readability of the represented information due to caused blurring.

When, however, there is determined a minimum contrast during pure reflection operation (here the dispersing layer acts to reduce the contrast), there can be determined the maximum permissible degree of dispersion for given cell properties, which also acts to increase the observing angle during transmissive operation.

This degree of dispersion can be adjusted by influencing the lacquer surface (dull lacquer roughness) through the type of the lacquer or lacquer mixture, through selected drying temperatures, or through the addition of white or light-dispersing materials (coloring materials based on $SiO_2$).

For further contrast optimization, without transition to more expensive manufacturing techniques, for each of the chambers 18 one proceeds from the recognition that the residual transmission of a blocked cell for a predetermined wavelength (i.e. the color) of the light which is irradiated from the rear opposite the viewing direction (in effect the light for the transmission drive of the cell) travels (at least) a minimum through the light wavelength. The wavelength, for which the absorption curve evidences a maximum, varies in dependence upon the cell thickness (in effect upon the thickness of the liquid crystal layer measured in the transilluminative direction, between the cell plates, coated with symbols electrodes towards the cell exterior with polarizer-analyzer towards the outside); and this position of the transmission minimum varies further in dependence upon the anisotropy of the optical refractory number of the liquid crystal material (Delta n).

For the usual liquid crystal cell manufacturing technology, there can be technologically optimized the liquid crystal layer thickness; namely, in particular pursuant to the extent of the required constant cell plate spacing, even for larger cell surfaces, through the utilization of spacer particles of predetermined thickness under consideration of a reaction of the liquid crystal viscosity on the technological capabilities of a reproduceable filling procedure and the quadratic dependence of the switching upon the layer thickness. In proven technologies with available glass spacer particles, and for usual liquid crystal materials which are suitable for motor vehicle instrumentation (for example, Types ZLI 1694 or 1957 of the company MERCK), the layer thickness (cell plate spacing) comprises approximately 8 μm. Already, because of not suitably available spacer particles, it would not be purposeful to vary the layer thickness for contrast optimization. At the concurrent display of a plurality of adjacent positioned information symbols with different transmission light colors, a layer thickness which correlated with the colors, anyway does not practically come into consideration because of the unitary spacer particles, when the multi-colored multiple information representation should, due to reasons of costs, be effectuated by means of a single large-surfaced liquid crystal cell, since regional thin glass layer inserts would not be practical.

A practical possibility of achieving a residual transmission minimum for a predetermined wavelength and a determinable layer thickness is provided through the available spacer or distancing particles; however, it lies in the correlation of the refractory anisotropy (Δn) with the employed liquid crystal material mixtures or blends.

Accordingly, pursuant to the present invention for contrast optimization there is proposed a way in which, that for the desired information color, at a production-technical possible layer thickness, in each chamber 18 there is presently utilized the liquid crystal material through the blending of different basic materials with precisely that Δn at which the minimum of the spectral residual transmissive curve lies within the spectral range of the desired information color.

For a light spectrum from a predetermined illuminating arrangement, through the interposition of a suitably selected color filter this light wavelength is then primarily filtered out within the worldwise predetermined display color (such as, for example, for the requirement "green display" of the respective spectral range about at 550 nm median wavelength), and applied as rearward illumination for the transmission drive, through a transflector screen, as is elucidated and illustrated hereinabove in detail.

For the representation of informations in different colors on different areas of the liquid crystal cell, as described the cell is suitably subdivided into a plurality of chambers 18, which are filled pursuant to the extent of the color prerequisite, with mutually differing liquid crystal materials (presently another Δn). For each of these fillings, the transmission light of this wavelength range is filtered out from the illuminating arrangement by means of a color filter associated with the area of the respective chamber.

The exact position of the employable minimum of the transmission curve (in effect, the wavelength of optimum absorption) varies with the environmental temperature; namely with the operating temperature of the liquid crystal material with the cell. In order to reduce this temperature dependency (of the optimized wavelength setting for an improved contrast of the negative display representation), it has been found as being advantageous, pursuant to a further feature of the present invention, that the liquid crystal cell chamber filling has admixed therewith a minor concentration of dichroitic coloring substances, such as are commercially available as guest color materials for GH-liquid crystal cells for different basic colors. This additive concentration, however, hereby lies at most at 1% to 2%, and is restricted to a coloring component which has its primary absorption within the spectral range of the highest residual transmission of the cell. Thereby, the concentration is substantially lower than in usual GH mixtures (6 to 8%) which additionally consist of a plurality of color molecular types; so that the usual, the electrical actuating capabilities (switching time) influenceable, noticeable increase in the viscosity of the liquid crystal materials will no longer occur herein.

As a further correlating measure for optimizing the contrast of the TN-negative display representation, it is purposeful to select a polarized filter pair adapted in its means, or even polarized filter pairs regionally limited to the respective chamber areas. The absorption of the colored light in the crossed polarized filter arrangement takes place in the colored dyes (in effect, in the introduced dye colors) of the polarized filter structures; as a result of which a correlation to the precise light wavelength selected for the absorption optimum, such as also to the dyes introduced for temperature compensation into the liquid crystal material, is experimentally easily determinable to provide a still more extensive contrast increase of the information display or representation.

What is claimed is:
1. A multi-colored liquid crystal display device comprising:
- a plurality of offset information areas;
- a liquid crystal cell;
- an illuminating device extending substantially over the entire display device;
- a plurality of colored foils having different colorings, said foils being spaced from and interposed between said liquid crystal cell and said illuminating device in alignment with respective information areas; and
- a white or bright metallic transflector arranged intermediate and spaced from said colored foils and said liquid crystal cell, said transflector having different colored areas in alignment with specific colored foils;
- whereby light from said illuminating device passes through said colored foils and then through the colored areas of the transflector to said liquid crystal cell to illuminate said information areas and light from the environment passes through said liquid crystal cell and is reflected by the colored areas of said transflector back through said liquid crystal cell to illuminate said information areas.

2. Display arrangement as claimed in claim 1, wherein said liquid crystal cells include a plurality of mutally-bounded chambers, said chambers being in a spatial relationship with specific colored foils, said chambers being filled with different liquid crystal material blends in accordance with the maximum absorption of the color of the transmission light from the respective colored foil.

3. Display arrangement as claimed in claim 2, wherein said blends include concentration of color-correlated dichroic coloring materials in the range of 1% -2%.

4. Display arrangement as claimed in claim 2 wherein said liquid crystal material blends have an optical anisotropy chosen to optimize the contrast of the environmental light and the color of the information area for a predetermined liquid crystal cell thickness.

5. Display arrangement as claimed in claim 1, wherein said colored transflector areas comprise color imprints on the surface of said transflector facing towards the liquid crystal cell.

6. Display arrangement as claimed in claim 1, wherein said transflector includes at least one colored area of the same color as the correspondingly aligned colored foil.

7. Display arrangement as claimed in claim 3, comprising adhesive tapes being arranged intermediate a front disc and a back disc of said liquid crystal cell so as to define said mutually-bounded chambers.

8. Display arrangement as claimed in claim 1, wherein said crystal cell includes an analyzer having a rough lacquer layer imposed thereon.

* * * * *